July 5, 1938.  O. J. URBANEK  2,122,901
HANDLE FASTENING MEANS
Filed Sept. 28, 1936
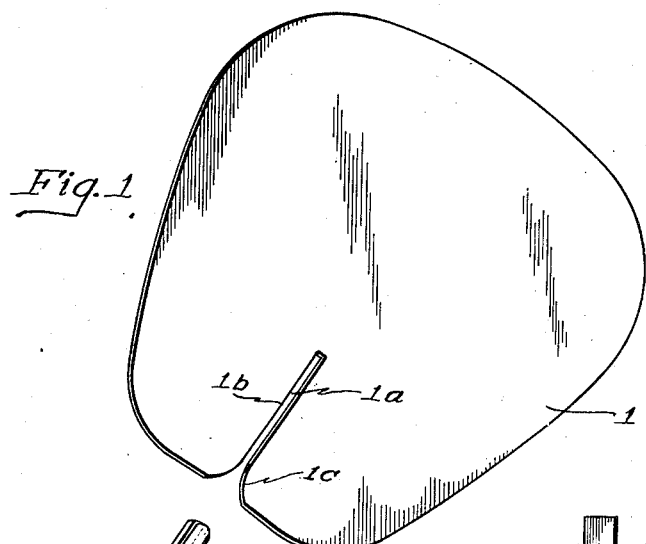
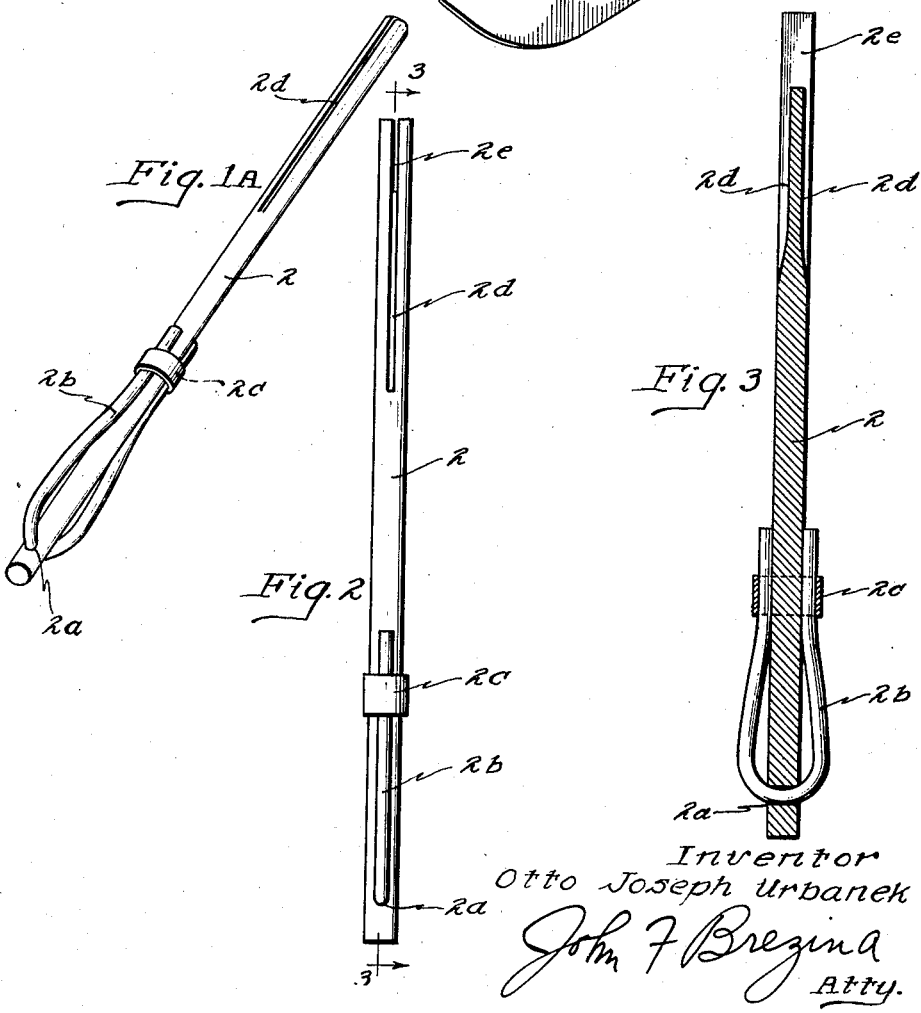
Inventor
Otto Joseph Urbanek
John F Brezina
Atty.

Patented July 5, 1938

2,122,901

UNITED STATES PATENT OFFICE 2,122,901

HANDLE FASTENING MEANS

Otto Joseph Urbanek, Chicago, Ill.

Application September 28, 1936, Serial No. 102,919

5 Claims. (Cl. 230—266)

This invention is a handle fastening means and is particularly adapted for fastening handles to fans, fly swatters, toys, garden and household tools, and the like.

An important object of this invention is the provision of means whereby a handle may be fastended to a blade without the necessity of using a staple, collar, rivet or the like in effecting a solid connection between said handle and blade.

A further object of my invention is the provision of a handle fastening means whereby the blade may be attached to a handle with sufficient rigidity for ordinary use and yet, at the same time, providing easy means for detaching the handle from the blade and attaching another thereto.

A still further object of this invention is the provision of a readily detachable fan and blade device which is extremely simple in construction, yet accomplishes the purposes for which it is designed.

A still further important object of the device is the provision of a handle fastening means the fitted parts of which may be assembled with a minimum of assembly operations.

A still further object of the device is the provisions of a handle which may be formed for use in connection with the blade with a minimum of manufacturing operations.

Another important object of the device is the provision of a handle fastening means, the handle of which may be formed ready for use without appreciable waste of material as has been experienced in the past in devices of this type.

Other objects and advantages will appear from the following description of illustrated embodiments of the present invention.

On the drawing:

Fig. 1 is a perspective view of the blade of the fan, fly swatter, toy, garden or household tool, or the like, detached from the handle and illustrating particularly the slot formed therein.

Fig. 1A is a perspective view of the handle which attaches, as herein set out, to the fan blade illustrated in Fig. 1, the handle being slightly turned to show one of the grooves formed in the handle.

Fig. 2 is a side elevational view of the bifurcated handle, showing particularly the slot formed at the upper end thereof and the side grooves.

Fig. 3 is a central vertical cross sectional view of the fan handle, taken on the line 3—3 of Fig. 2 showing the relative shape and position of the transverse slot and plurality of grooves formed opposite one another in the upper part of the handle and the hand grip.

As shown on the drawing

The numeral 1 indicates a blade such as is commonly used on fans, fly swatters, toys, household and garden tools and the like. Formed in blade 1 and extending from the periphery thereof substantially into the main body portion thereof is a slot 1a, the numeral 1b indicating that portion of said slot having parallel opposed edges in the same plane. The numeral 1c indicates that portion of said slot, the edges of which are arcuately formed in opposite directions in the same plane and adapted, as later herein indicated, to fit into the oppositely formed grooves in the handle portion 2.

As shown in Fig. 1A, the numeral 2 indicates the handle portion, which in preferred form is substantially cylindrical-shaped. At its lower end is a transverse hole, indicated by the numeral 2a through which a section of flexible wood 2b or the like is passed and turned backward in the direction of the length of the handle portion 2, being held in place by an annular collar member 2c, forming a handle.

As further shown in the drawing, the handle has, at its upper end, a transverse slot indicated by the numeral 2e forming a bifurcated end which is formed substantially at the center thereof, and extending substantially lengthwise of the handle portion 2. Extending from the rearwardmost part of slot 2e are grooves, indicated by the numeral 2d, on diametrically opposite sides of the handle portion 2. The said grooves 2d are formed lengthwise in said handle 2 and are, of themselves, the same length as the slot 1a in blade portion 1. The slot 2e slips substantially beyond the innermost end of slot 1a, adding rigidity to the actual portion of the blade 1.

It will be seen from the detailed description above that this invention provides a blade and handle which may be readily fitted together and which provides means whereby the movement of the blade in any direction will be supported by and confined to the similar movement of the handle. The slot 2e, fitting the blade tightly, and extending substantially beyond the innermost portion of blade slot or aperture 1a, confines and supports the blade in its movement perpendicular to the face plane of the blade. The parallel edges of the slot 1a fitting tightly into the grooves 2d in the handle 2, and the arcuate portions 1b in the blade 1, likewise fitting into the oppositely arcuately formed rearward portions of said slots 2d, also tend to support the blade in its movement perpendicular to the plane of said blade, and effectively confine the relative movement of the blade and handle in any direction of movement of the plane of said blade 1.

The relative rigidity of fastening the blade and handle together may be controlled by varying the width, depth and length of the bifurcated slot portion 2e, and the grooves 2d in the handle portion 2. For instance in using a blade 3/64 of an inch thick the slot 2e and grooves 2d may be, say, 1/32 of an inch wide, and ample rigidity may be attained by the friction between the parts when forced together. If desired, glue or other suitable adhesive may be applied to the edges of the slot 1a, which in addition to the normal friction between the parts will create an additionally firm connection between the blade 1 and the handle 2. It is obvious that the deeper the slot 2e and grooves 2d are made, and the correspondingly more narrow and angularly formed slot 1a in blade 1 is made, the more friction there will be between the relative parts when forced together.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a handle fastening means, a blade having a relatively long narrow rectangular centrally extending slot formed therein, said slot curving arcuately outward near the periphery of said blade, and a handle having a centrally laterally formed slot therein and a pair of relatively long diametrically opposed grooves extending substantially longitudinally therein terminating at the rearward portion of said slot in said handle and curving arcuately outward at the most rearward part of said groove, said slot and grooves in said handle adapted to frictionally engage said slot in said blade, forming a relatively tight connection between said blade and said handle.

2. In an article of the class described, in combination, a substantially rigid handle bifurcated at one end by a diametrically extending slot extending a relatively short distance from said end, said handle having a pair of relatively long longitudinally extending grooves on diametrically opposite sides of said handle which merge with said slot; a relatively flat blade having a relatively long inwardly extending slot opening on the blade preferably forming rounded shoulders thereat, said blade slot being adaptable to receive and frictionally engage and retain the bifurcated and slotted end of said handle, the edges of said blade slot seating in said respective handle grooves.

3. In an article of the class described, the combination of a handle having a slot in one end thereof bifurcating the same and having a pair of side slots on opposite sides of said handle terminating forwardly at the rearward terminal of said slot bifurcating said handle, said side slots extending a relatively long distance longitudinally of said handle and terminating rearwardly in arcuate portions of lesser depth than the main portion of said slots and extending arcuately to the surface of said handle, a blank forming a blade and having a relatively long slot therein, the longitudinal edges of which are parallel with one another a substantial portion of their length and are arcuately formed near the periphery of said blank, said slot in said blade adapted to fit closely into the oppositely formed slots in said handle, the bifurcated end of said handle extending beyond the innermost terminal of said slot in said blade, forming a relatively tight connection between blade and handle.

4. In an article of the class described, the combination of a relatively compressible blade having a relatively narrow rectangular slot extending a relatively long distance into the body thereof, the edges of said slot being parallel to one another practically their entire length and curved arcuately away from one another at the periphery of said blade, and a handle having a relatively shallow diametrically extending slot therein forming a bifurcated end and a pair of oppositely formed side grooves extending a relatively long distance longitudinally of said handle from the rearwardmost end of the slot bifurcating said handle a distance equal to the total depth of the slot in said blade and curving arcuately to the surface of said handle at their rearwardmost ends forming shoulders, said bifurcated end and grooves in said handle being slightly more narrow than the thickness of said blade, said handle fitting into the slot in said blade, the bifurcated end of said handle over-extending the end of the slot in said blade and the shoulders formed by said grooves in said handle over-extending the edges of the slot in said blade when said handle is inserted, said blade being slightly compressed within the bifurcated end and said grooves in said handle when inserted and retained therein by friction.

5. In an article of the class described, the combination of a blade having a relatively narrow rectangular slot extending a relatively long distance into the body thereof, the edges of said slot being parallel to one another practically their entire length and curved arcuately away from one another at the periphery of said blade, and a handle having a relatively shallow diametrically extending slot therein forming a bifurcated end and a pair of oppositely formed side grooves extending a relatively long distance longitudinally of said handle from the rearwardmost end of the slot bifurcating said handle a distance equal to the total depth of the slot in said blade and curving arcuately to the surface of said handle at their rearwardmost ends forming shoulders, the distance between said side grooves being slightly greater than the width of the slot in said blade, said bifurcated end and grooves in said handle being slightly more narrow than the thickness of said blade, said handle fitting into the slot in said blade, the bifurcated end of said handle over-extending the end of the slot in said blade and the shoulders formed by said grooves in said handle over-extending the edges of the slot in said blade when said handle is inserted, said blade being slightly compressed within the bifurcated end and shoulders formed by said side grooves in said handle when inserted and retained therein by friction.

OTTO JOSEPH URBANEK.